United States Patent
Dhammawat et al.

(10) Patent No.: US 11,757,707 B2
(45) Date of Patent: Sep. 12, 2023

(54) NETWORK ASSURANCE FOR 5G ENTERPRISE NETWORKS

(71) Applicant: Cisco Technology, Inc., San Jose, CA (US)

(72) Inventors: Abhishek Dhammawat, San Jose, CA (US); Sri Gundavelli, San Jose, CA (US); Mahesh Satyanarayana, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 17/386,939

(22) Filed: Jul. 28, 2021

(65) Prior Publication Data
US 2023/0033202 A1 Feb. 2, 2023

(51) Int. Cl.
*H04L 41/069* (2022.01)
*H04L 67/146* (2022.01)
*H04W 24/08* (2009.01)

(52) U.S. Cl.
CPC .......... *H04L 41/069* (2013.01); *H04L 67/146* (2013.01); *H04W 24/08* (2013.01)

(58) Field of Classification Search
CPC ..... H04L 41/069; H04L 67/146; H04W 24/08
See application file for complete search history.

(56) References Cited

U.S. PATENT DOCUMENTS

| 2019/0053010 | A1 | 2/2019 | Edge et al. |
| 2020/0092722 | A1 | 3/2020 | Hu et al. |
| 2020/0092758 | A1 | 3/2020 | Youn et al. |
| 2020/0259896 | A1* | 8/2020 | Sachs .................. H04J 3/0667 |
| 2020/0367297 | A1 | 11/2020 | Dao et al. |
| 2021/0084713 | A1 | 3/2021 | Miklos et al. |
| 2022/0124542 | A1* | 4/2022 | Li ........................ H04W 88/085 |
| 2023/0010519 | A1* | 1/2023 | Rao Kota ......... H04W 28/0289 |

\* cited by examiner

*Primary Examiner* — Duc C Ho
(74) *Attorney, Agent, or Firm* — Polsinelli

(57) ABSTRACT

The present technology discloses methods, systems, and non-transitory computer-readable storage media for identifying a data communication session within a 5G enterprise network and providing assurance based on the identified data communication session. The present technology provides for establishing a data communication session for user equipment on a 5G network, generating a protocol data unit (PDU) session identifier for the data communication session, and distributing the PDU session identifier to one or more packet core nodes in the 5G network. The PDU session identifier can then be used for collecting one or more key performance indicators in association with the data communication session.

20 Claims, 9 Drawing Sheets

Protocol Data Unit (PDU) Session Identifier 370
- Node IP Address 380
- Software Process ID 382
- Random Number 384

FIG. 3B

NETWORK ASSURANCE FOR 5G ENTERPRISE NETWORKS

DESCRIPTION OF THE RELATED TECHNOLOGY

The subject matter of this disclosure relates in general to operations of an enterprise network, and more specifically to identifying a data communication session within a 5G enterprise network and providing assurance based on the identified data communication session.

BACKGROUND

Utilization of 5G network architecture for enterprise networks are on the rise. Typically, in an Enterprise deployment (e.g., enterprise networks having mission critical devices, robots and IOT devices) where reliability and assurance are key to success, there is need for having the End to End network assurance for a particular data communication session.

5G packet core has some distinct characteristic which makes it complex to debug and capture information proactively. Unlike Wi-Fi system where a Wi-Fi controller has a central intelligence system, in the case of 5G systems, the packet core nodes are distributed in nature and tracking subscriber information proactively across all node is complex and time-consuming.

Currently there is no single coherent approach for identifying a protocol data unit (PDU) session across different network nodes (e.g., 5G network nodes such as gNodeB (gNB) nodes, access and mobility management function (AMF) nodes, session management function (SMF) nodes, user plane function (UPF) nodes). Further, there is currently no single approach for identifying key performance indicators (KPIs) for these nodes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3B illustrates an example PDU session identifier, according to some aspects of the present disclosure;

DETAILED DESCRIPTION

Figure 1A:
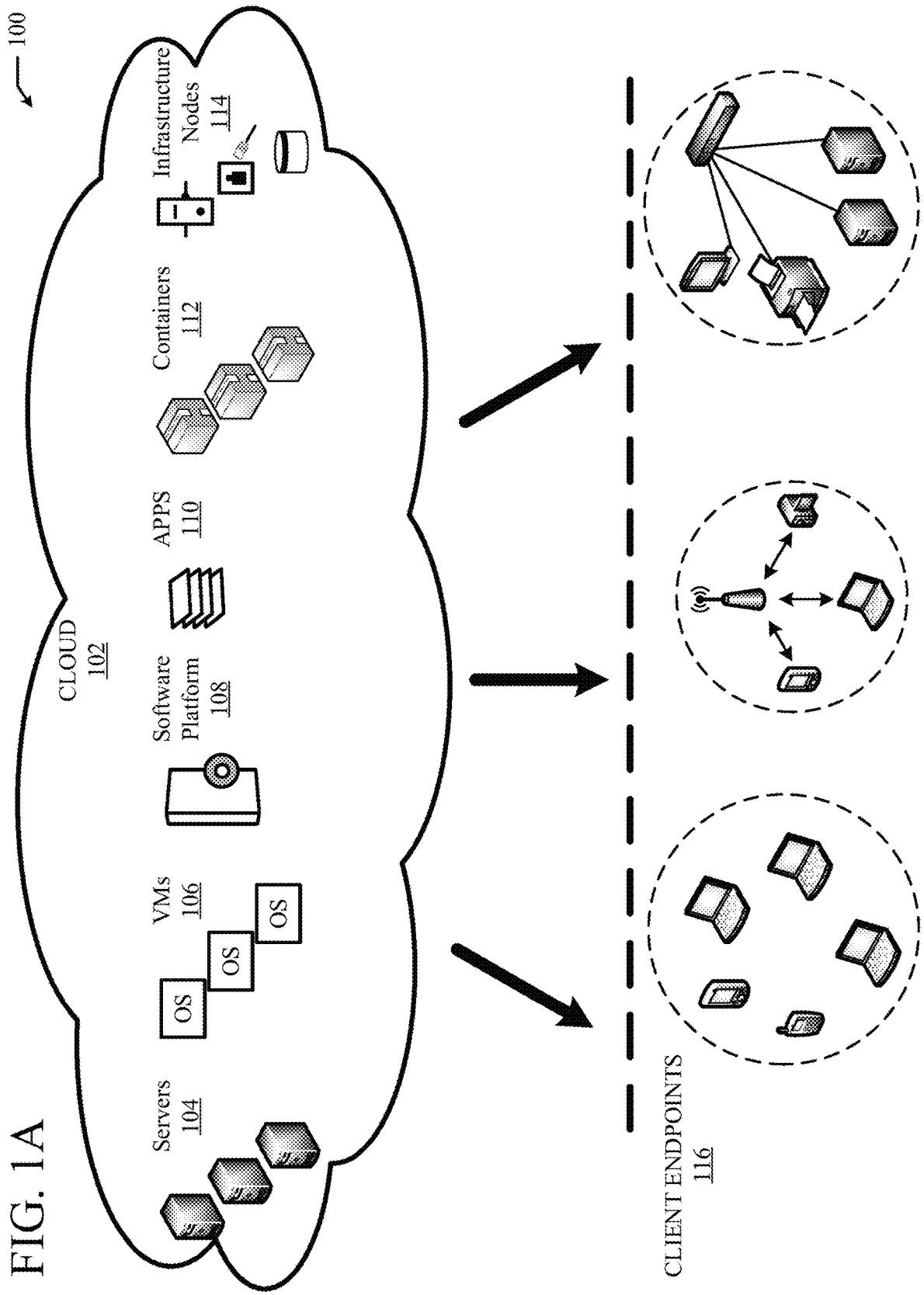
FIG. 1A illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the present disclosure are directed to identifying a unique session identifier for data communication session within a 5G enterprise network and providing performance assurance using the unique session identifier.

In one aspect, a method can include establishing a data communication session for user equipment on a 5G network, generating a protocol data unit (PDU) session identifier for the data communication session, and distributing the PDU session identifier to one or more packet core nodes in the 5G network where the PDU session identifier being used for collecting one or more key performance indicators in association with the data communication session.

In some aspects, the PDU session identifier can include a node internet protocol (IP) address, a software process identifier, and a random number.

In some aspects, the PDU session identifier can be used for collecting the one or more key performance indicators by receiving logs from the one or more packet core nodes in the 5G network wherein the logs contain the PDU session identifier, using the PDU session identifier to generate from the logs a report on the one or more key performance indicators for the data communication session, and outputting the one or more key performance indicators upon receiving a request for the report.

In some aspects, the PDU session identifier can contain an authentication session identifier, the authentication session identifier used to troubleshoot communication between the one or more packet core nodes and an assurance service.

In some aspects, the PDU session identifier can be distributed to one or more packet core nodes in the 5G network as part of an existing messaging paradigm.

In some aspects, the one or more key performance indicators can include an event and state history of the session, a flow diagram, or node issues.

In some aspects, the PDU session identifier can be generated by a session management function of a core component of the 5G network and shared with the one or more packet core nodes.

In one aspect, a network device can include one or more memories having computer-readable instructions stored therein; and one or more processors. The one or more processors are configured to execute the computer-readable instructions to establish a data communication session for user equipment on a 5G network, generate a protocol data unit (PDU) session identifier for the data communication session, and distribute the PDU session identifier to one or more packet core nodes in the 5G network, the PDU session identifier being used for collecting one or more key performance indicators in association with the data communication session.

In one aspect, one or more non-transitory computer-readable media can include computer-readable instructions which, when executed by one or more processors of a network device, cause the network device to establish a data communication session for user equipment on a 5G network, generate a protocol data unit (PDU) session identifier for the data communication session, and distribute the PDU session identifier to one or more packet core nodes in the 5G network, the PDU session identifier being used for collecting one or more key performance indicators in association with the data communication session.

EXAMPLE EMBODIMENTS

As noted above, in an Enterprise deployment (e.g., enterprise networks having mission critical devices, robots and IOT devices) where reliability and assurance are key to success, there is need for having the End to End network assurance for a particular data communication session.

5G packet core has some distinct characteristic which makes it complex to debug and capture information proactively. Unlike Wi-Fi system where a Wi-Fi controller has a central intelligence system, in the case of 5G systems, the packet core nodes are distributed in nature and tracking subscriber information proactively across all node is complex and time-consuming.

Currently there is no single coherent approach for identifying a protocol data unit (PDU) session across different network nodes (e.g., 5G network nodes such as gNB, AMF, SMF, UPF). Further, there is currently no single approach for identifying key performance indicators (KPIs) for these nodes.

The disclosed technology addresses the need in the art for providing a unique PDU session identifier for any given User Equipment (UE) session within an enterprise 5G network. Currently, PDU sessions are not identified by a common identifier. As sessions are spread throughout multiple nodes in a 5G network, there is neither a single source for providing session information for any particular connection nor there is a way to correlate information from various nodes to create a session snapshot.

In some aspects, the present disclosure provides a single PDU session identifier for any given network connection and distributes the same among various core nodes in a 5G network such as gNB, AMF, SMF, UPF, etc. Furthermore, in some aspects, the present disclosure provides systems and methods for correlating data gathered from such nodes having access to the PDU session identifier to create a comprehensive overview of the session including KPIs for a given session.

Figure 1B:
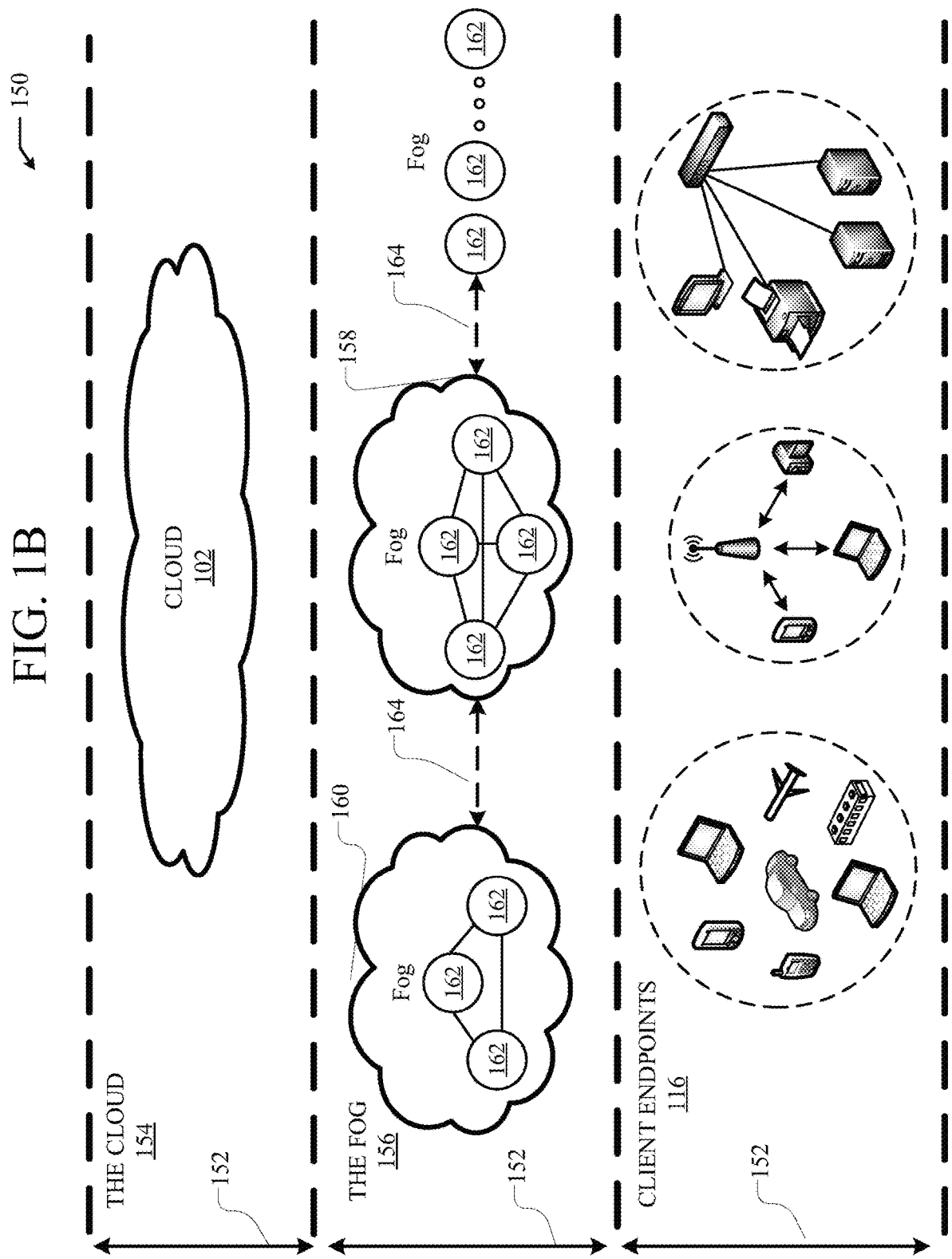
FIG. 1B illustrates an example fog computing architecture, according to some aspects of the present disclosure.
Figure 2:
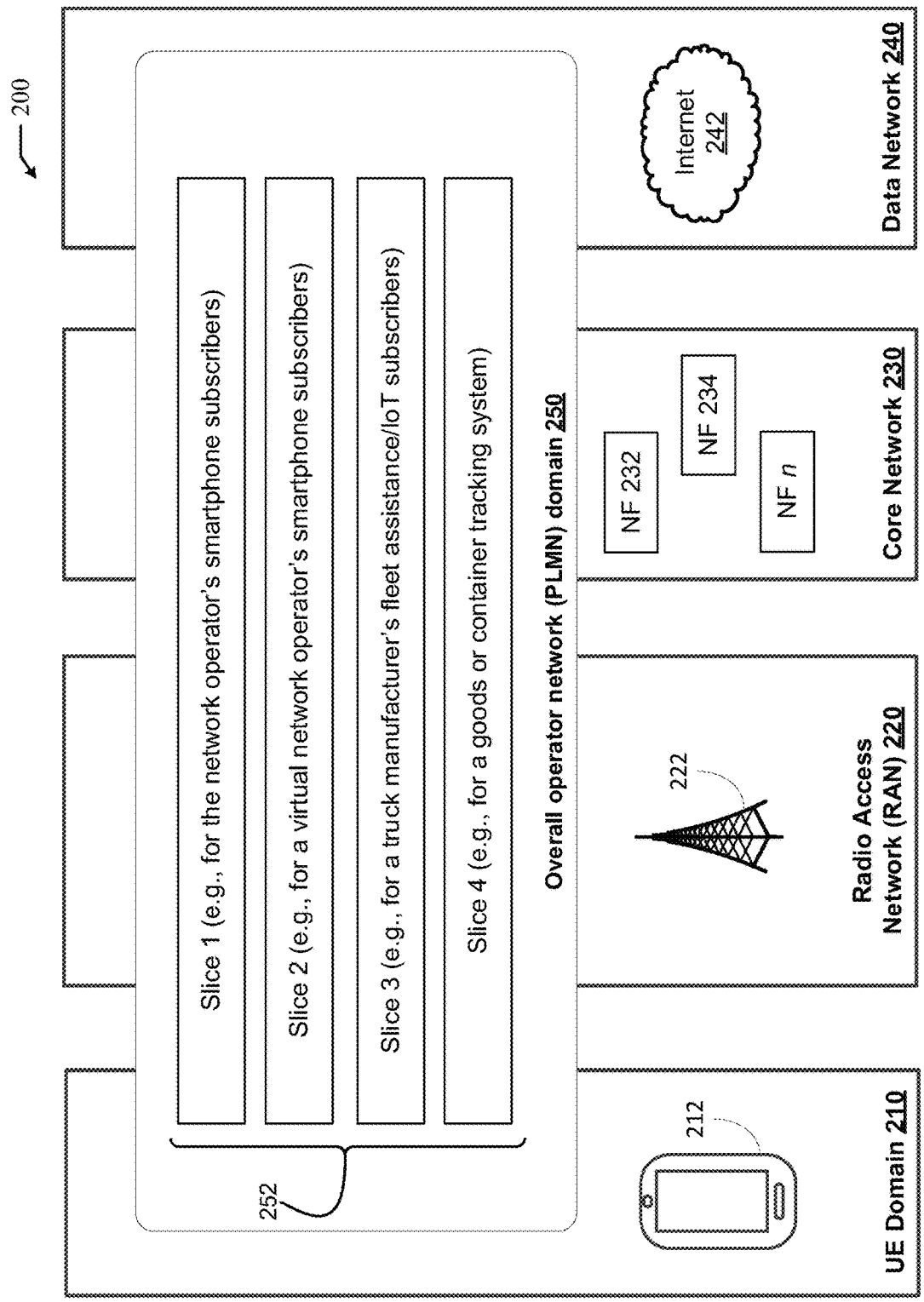
FIG. 2 depicts an exemplary schematic representation of a 5G network environment in which network slicing has been implemented, and in which one or more aspects of the present disclosure may operate, according to some aspects of the present disclosure.

A description of network environments and architectures for network data access and services, as illustrated in FIGS. 1A, 1B, and 2 is first disclosed herein. A discussion of systems, methods, and computer-readable medium for identifying a PDU session within a 5G enterprise network and providing assurance based on the identified PDU session, as shown in FIGS. 3-5, will then follow. The discussion then concludes with a brief description of example devices, as illustrated in FIG. 6. These variations shall be described herein as the various embodiments are set forth. The disclosure now turns to FIG. 1A.

FIG. 1A illustrates a diagram of an example cloud computing architecture, according to some aspects of the present disclosure. The architecture 100 can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS)(e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc. In some examples, the cloud 102 may be an enterprise network utilizing a 5G wireless network infrastructure and may be referred to as a 5G enterprise network.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture, according to some aspects of the present disclosure. The fog computing architecture 150 can be used to form part of a TCP connection or otherwise be accessed through the TCP connection. The fog computing architecture 150 can also be a non-limiting example of a 5G enterprise network. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment in which network slicing has been implemented, and in which one or more aspects of the present disclosure may operate, according to some aspects of the present disclosure. In some examples, the 5G network environment 200 can be utilized to implement the cloud 102 of FIG. 1A and/or the fog computing architecture 150 of FIG. 1B.

As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some example embodiments, core network 230 is a 5G core network (5GC) in accordance with one or more accepted 5GC architectures or designs. In some example embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some example embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some example embodiments, an AMF/MME can be common to or otherwise shared by multiple slices of the plurality of network slices 252, and in some example embodiments an AMF/MME can be unique to a single one of the plurality of network slices 252.

Similarly, the remaining NFs of core network 230 can be shared amongst one or more network slices or provided as a unique instance specific to a single one of the plurality of network slices 252. In addition to NFs including an AMF/MME as discussed above, the plurality of NFs of the core network 230 can include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across the four domains of the 5G network environment 200, an overall operator network domain 250 is defined. The operator network domain 250 is in some example embodiments a Public Land Mobile Network (PLMN), a private 5G network and/or a 5G enterprise network, and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN), a private 5G network and/or a 5G enterprise network for providing services to UEs. This network slicing permits for the controlled composition of the 5G network with the specific network functions and provided services that are required for a specific usage scenario. In other words, network slicing enables a 5G network operator to deploy multiple, independent 5G networks where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

With various examples of a 5G based networks including a 5G enterprise network described above with reference to FIGS. 1A-B, and 2, the disclosure now provides one or more example embodiments for associated a unique session identifier with each UE session within a 5G network.

As noted above, currently there is no single coherent approach for identifying a PDU session across different network nodes of a 5G network (e.g., 5G network nodes such as gNB, AMF, SMF, UPF). Further, there is currently no single approach for identifying key performance indicators (KPIs) for these nodes due to the lack of a coherent approach for identifying a PDU session.

The disclosed technology addresses the need in the art for providing a unique PDU session identifier for any given User Equipment (UE) session within an enterprise 5G network.

Figure 3A:
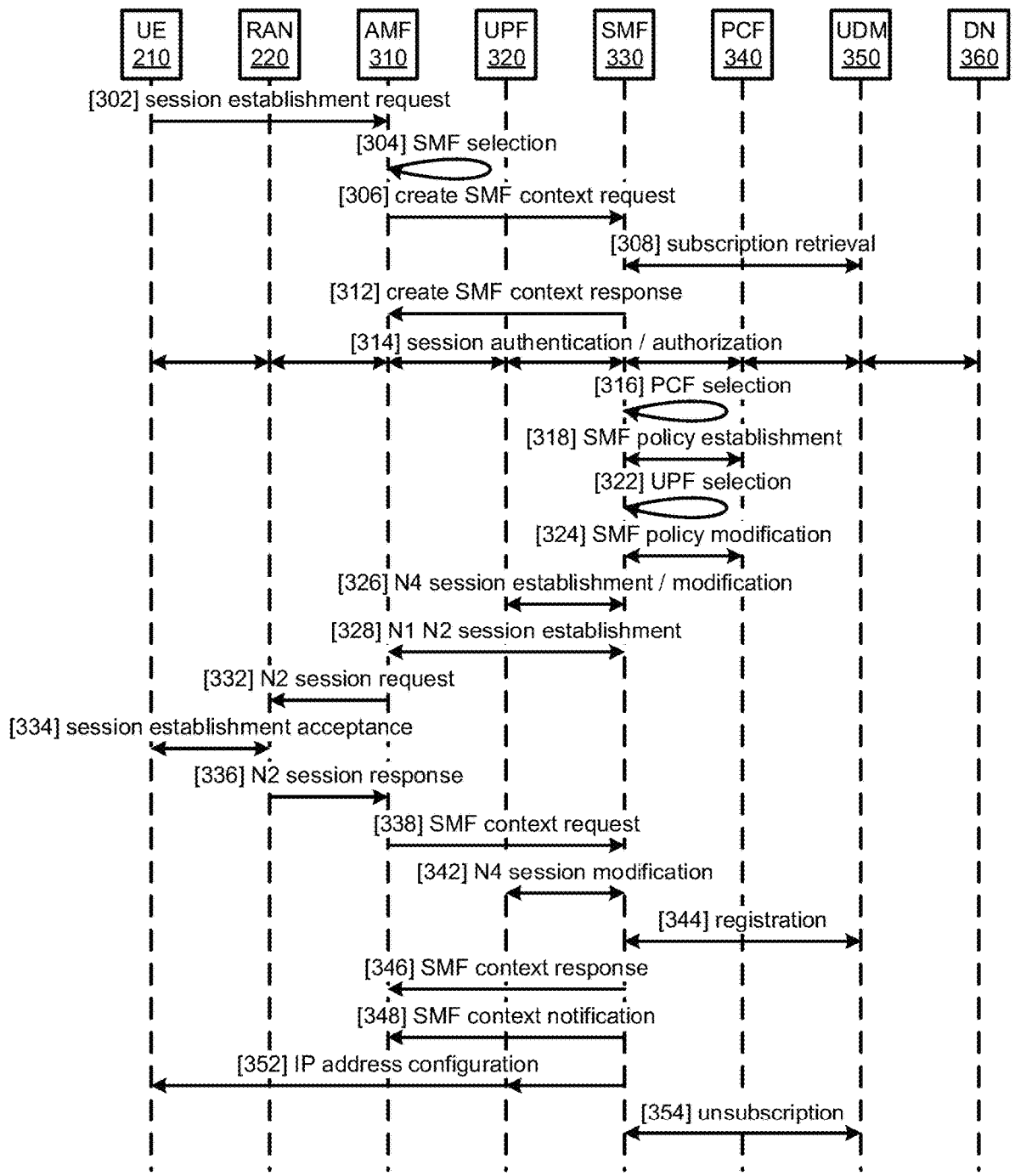
FIG. 3A illustrates an example flowchart for identifying a PDU session within a 5G enterprise network.
Figure 4:
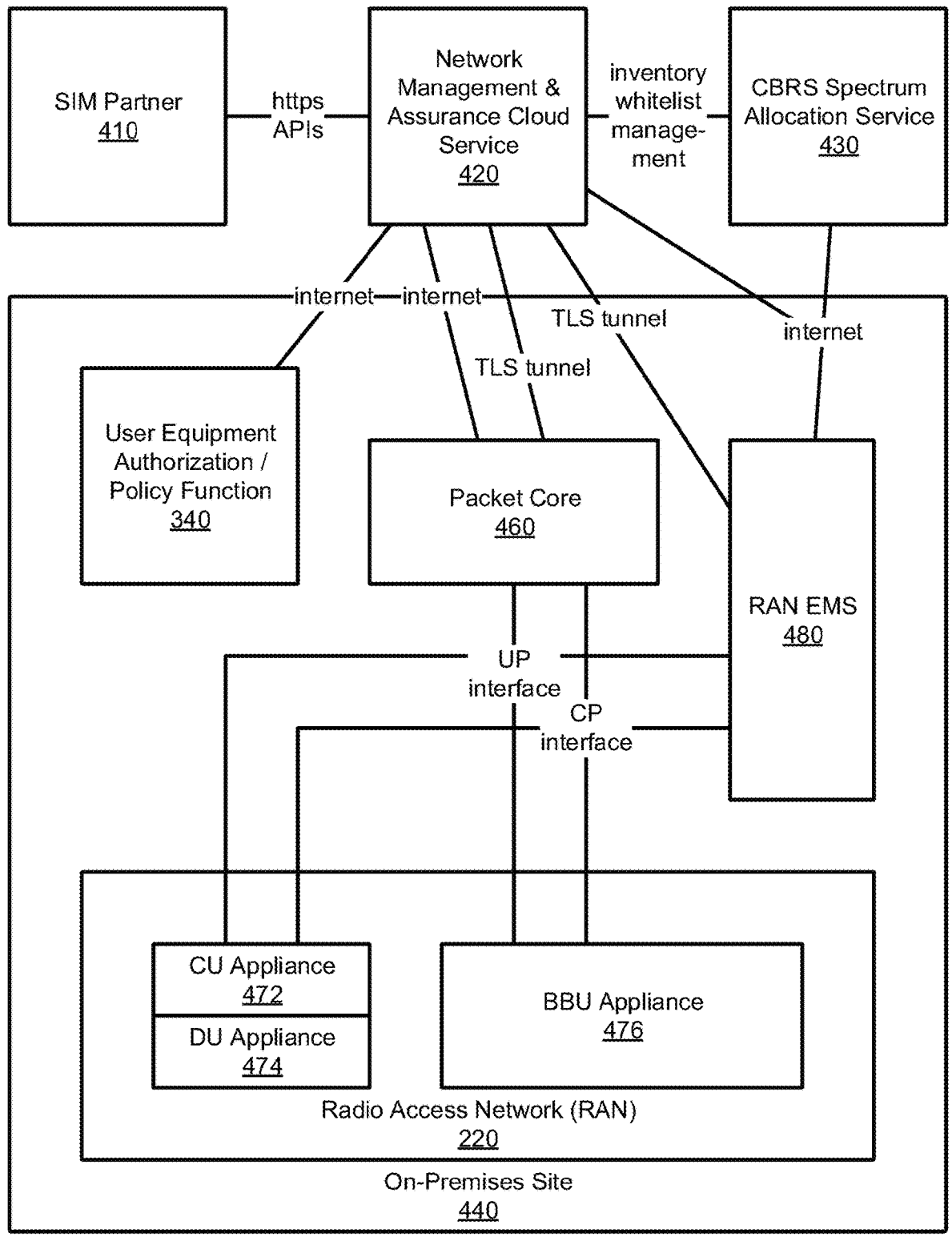
FIG. 4 illustrates an example system for providing assurance based on the identified PDU session, according to some aspects of the present disclosure.

FIG. 3A illustrates an example flowchart for identifying a PDU session within a 5G enterprise network and providing assurance based on the identified PDU session, according to some aspects of the present disclosure. The process of FIG. 3A can be implemented within a context of a 5G enterprise network such as those described above with reference to FIGS. 1A-B and 2.

User equipment (UE) 210 can be the same as any one of client endpoints 116 of FIG. 1A or a UE in the user equipment domain 210 described above with reference to FIG. 2. (R)AN 220 can be the same as radio access network 220 described above with reference to FIG. 2. Access and mobility management function (AMF) 310 can be a network function (NF) within core network 230, such as NFs 232 or 234, as described above with reference to FIG. 2. User plane function (UPF) 320 can be an NF, such as NFs 232 or 234, within core network 230 as described above with reference to FIG. 2. Session management function (SMF) 330 can be an NF, such as NFs 232 or 234, within core network 230 as described above with reference to FIG. 2. Policy control function (PCF) 340 can be an NF, such as NFs 232 or 234, within core network 230 as described above with reference to FIG. 2. Unified data management (UDM) 350 can be an NF, such as NFs 232 or 234, within core network 230 as described above with reference to FIG. 2.

The operations illustrated in FIG. 3A can include existing messaging protocols and paradigms, into which the PDU session identifier can be included. This allows for seamless integration of the PDU session identifier into pre-existing infrastructure.

At operation 302, UE 210 can send a PDU session establishment request to AMF 310, which can ultimately lead to the establishment of a data communication session. The data communication session can be established to an end-to-end user plane connectivity between UE 210 and a data network such DN 360. At operation 304, AMF 310 can choose an SMF 330 from a set of available SMFs for establishing the PDU session. At operation 306, AMF 310 can create an SMF context request and send it to SMF 330. At operation 308, SMF 330 can subscribe to UDM 350, which can offer notifications and updates to SMF 330 when available. At operation 312, SMF 330 can create an SMF context response and send it to AMF 310. At operation 314, the session between UE 210 and DN 360 can be authenticated and authorized by the relevant packet core nodes in the 5G network.

At operation 316, SMF 330 can select a PCF 340 from a set of PCFs. At operation 318, SMF 330 and PCF 340 can establish the SMF policy for the session. In one example, the SMF policy can be established according to SLA with the UE 210 or one or more connection and security policies of the corresponding 5G enterprise network. At operation 322, SMF 330 can select a UPF 320 from a set of UPFs. At operation 324, SMF 330 and PCF 340 can modify the SMF policy based on the selected UPF 320.

At operation 326, SMF 330 can establish a PDU session with UPF 320. The session can be established over an N4 interface, the bridge between the control plane and the user plane. SMF 330 can include a unique PDU session identifier with the session establishment request. Once it receives the PDU session identifier, UPF 320 can allocate the session context and maintain the PDU session identifier as the session lookup key for key performance indicators (KPIs) and assurance information for the session.

As illustrated in FIG. 3B, PDU session identifier 370 can be composed of three components: node IP address 380 containing an IP address of SMF 330, software process ID 382 for the session management process on SMF 330, and random number 384 generated by SMF 330. The IP address of SMF 330 can be used to communicate over an N4 interface with UPF 320. PDU session identifier 370 can be a concatenation of these three components, represented as numbers. Node IP address 380 can be represented in 4 bytes, software process ID 382 can be represented in 1 byte, and random number 384 can be 3 bytes, resulting in an 8 byte PDU session identifier 370. For example, an IP address 192.168.0.1 for SMF 330 can be written as a hex integer as 0xC0A80001. By combining these three components, PDU session identifier 370 will be unique across various types of nodes, including gNB nodes, AMF nodes, SMF nodes, and UPF nodes. In some embodiments, node IP address 380 can be an IP address for user equipment 210.

The PDU session identifier can include an authentication session ID. This authentication session ID can be useful for troubleshooting communication between AMF 310/SMF 330 and an identity services engine, for example. The PDU session identifier can be constructed based on a PDU session ID provided by UE 210 and an international mobile subscriber identity (IMSE). The PDU session identifier can leverage the IP address allocated for the PDU session establishment for UE 210 instead of the IP address of SMF 330.

At operation 328, SMF 330 can establish a session with AMF 310 across N1 and N2 interfaces. This message transfer can include the PDU session identifier. In one example, SMF 330 can provide the PDU session identifier to AMF 310 in message Namf_Communication_N1N2messagetransfer.

Once AMF 310 receives the PDU session identifier, AMF 310 can allocate the session context and maintain the PDU session identifier as the session lookup key for key performance indicators (KPIs) and assurance information for the session.

Once received by any node, including SMF 330, AMF 310, or UPF 320, the PDU session identifier can be included in subsequent messages to any node and thus propagated throughout the network, as will be described below.

At operation 332, AMF 310 can send a session establishment request across an N2 interface to (R)AN 220, where the request can be a non-access stratum (NAS) message. This request can include the PDU session identifier. In one example, SMF 330 provides in message "N2 PDU session request" the new information element "PDU Session Identifier" along with the device IMSI. gNB (e.g., RAN 220) shall be maintaining session KPIs at its end utilizing this SMF provided session identifier, which will be further described below.

In another example, the common PDU Session Identifier generation can have authentication "Auth Session Id" be part of the PDU Session Identifier and this can help in troubleshooting the communication of AMF 310/SMF 330 to ISE (or AUSF) as well providing additional dimension to the troubleshooting. For example, the ISE or AUSF can be network management and assurance service 420 as illustrated in FIG. 4, which may be a cloud based service.

In another example, the common session identifier can be constructed based on IMSI+UE provided PDU session ID. UE provided PDU session ID alone is not sufficient as its between 1 to 15.

In another example, the common session identifier may be generated by leveraging the IP address allocated for UE PDU session establishment instead of SMF self IP address as mentioned above.

At operation 334, UE 210 and (R)AN can accept the establishment of the PDU session with the known PDU session identifier. At operation 336, (R)AN can send a session establishment response across an N2 interface to AMF 310, indicating that the session is established. This request can include the PDU session identifier. After operation 336, UE 210 is able to send uplink data to UPF 320. This data transmission can include the PDU session identifier.

At operation 338, AMF 310 can send an SMF context request to SMF 330. This request can include the PDU session identifier. At operation 342, SMF 330 and UPF 320 can modify the session over an N4 interface. At operation 344, SMF 330 can register with UDM 350 and provide the PDU session identifier as part of the registration. After operation 344, UPF 320 is able to send downlink data to UE 210 that can be sent along with the PDU session identifier. At operation 346, SMF 330 can send an SMF context response to AMF 310. Again, this response can also include the PDU session identifier.

At operation 348, SMF 330 can send an SMF context status notification to AMF 310 including the PDU session identifier. At operation 352, SMF 320 can send an IP address configuration to UPF 320 and UE 210 including the PDU session identifier. At operation 354 and upon termination of the data communication session between UE 210 and DN 360, SMF 330 can unsubscribe from UDM 350.

FIG. 3A illustrates how a PDU session identifier can be generated (e.g., by SMF 330) and propagated throughout a 5G network. An example PDU session identifier is illustrated in FIG. 3B. As noted above, another shortcoming of existing systems is that there is no single approach for identifying key performance indicators (KPIs) for these nodes. As will be described below with reference to FIG. 4, the unique PDU session identifier can be used for identifying key performance indicators (KPIs) for nodes in a 5G network.

FIG. 4 illustrates how this PDU session identifier can be used to provide efficient assurance in the 5G network. FIG. 4 illustrates an example system for assurance in a 5G networking environment, according to some aspects of the present disclosure. The assurance system can gather information from packet core nodes in a 5G network and gather data relevant to the user session with the PDU session identifier described in FIGS. 3A and 3B.

Key performance indicators used in assurance for the 5G network can be gathered and assessed per packet core node type, such as per gNB, per SMF, per UPF, and per AMF, as well as per user equipment. PDU session level KPIs and statistics may include packet forwarding control protocol (PFCP) statistics, non-access stratum (NAS) statistics, NG application protocol (NGAP) message statistics, quality of service (QoS) flow deletion or failure statistics, handover statistics, or user equipment PDU session event history.

These KPIs can be used for troubleshooting and lifecycle understanding/assurance for a particular user equipment.

SIM partner 410 can be any SIM provider, such as Verizon, AT&T, or Sprint. Network management and assurance cloud service 420 can manage and provide assurance for users accessing a 5G network (e.g., a 5G enterprise network) via SIM partner 410. Network management and assurance cloud service 420 can be a network (e.g., an enterprise network) control component such as CISCO DNA Center. Network management and assurance cloud service 420 can communicate with SIM partner 410 via an application programming interface (e.g., a https API). Network management and assurance cloud service 420 can receive data from various network nodes, such as AMF 310, UPF 320, or SMF 330 as described above with reference to FIG. 3A relating to a PDU session. CBRS spectrum allocation service 430 can be a server which assigns CBRS bands to different networks include a 5G enterprise network deployed at on-premise site 440 and controlled via network management and assurance cloud service 420.

On-premises site 440 can be a branch site of an enterprise using a 5G network such as example 5G networks utilized within an enterprise network as described above with reference to FIGS. 1A-B and 2. User equipment authorization/policy function 340 can be substantially similar to policy core function 340 as illustrated in FIG. 3A. Packet core 460 can be a packet core for on-premises site 440. Packet core 460 can be comprised of multiple nodes, such as AMF 310 or SMF 330 as described above with reference to FIG. 3A.

RAN 220 can be substantially similar to RAN 220 illustrated in FIG. 3A. CU appliance 472 can be a central unit while DU appliance 474 can be a distributed unit. Central units support C-RAN, a centralized cloud computing-based architecture for radio access networks. Distributed units support distributed cloud computing-based architecture for radio access networks. BBU appliance 476 can be a baseband unit, which can support 4G networks. All units within RAN 220 can communicate via the control plane (CP) or user plane (UP) with packet core 460 and RAN element management system (EMS) 480. RAN EMS 480 can act as a medium between RAN 220 and CBRS spectrum allocation service 430 and network management and assurance cloud service 420.

Network management and assurance cloud service 420 can receive a service request for assurance containing an enterprise ID or IMSI. Given this identifier, network management and assurance cloud service 420 can lookup data from received PDU sessions and provide a list of PDU session identifiers. From the list of PDU session identifiers, a PDU session identifier can be chosen and all session data is obtained by network management and assurance cloud service 420 from various packet core nodes, such as packet core 460, for example including gNB, AMF, SMF, and UPF nodes.

Network management and assurance cloud service 420 can use different trace and system logs obtained from, for example, packet core 460 for analysis, filtering, and correlating based on the common PDU session identifier present in the logs. Network management and assurance cloud service 420 can write all related log content into a single report including timestamps from individual logs. This report provides a snapshot of the session overall.

Using the report, network management and assurance cloud service 420 can generate KPIs, statistics, and further analysis. Outputs can include business and troubleshooting insights. For example, the report may indicate an unexpectedly long lag in communications between AMF 310 and SMF 330, which could be grounds for investigation into hardware, software, or other problems in the 5G network. The report can correlate issues reported by different network nodes to better understand the problems at hand.

The report can include a flow diagram for the lifecycle of the PDU session. This information can be used by a network administrator to see all events and messages in the PDU session as a clear end-to-end network flow diagram.

Figure 5A:
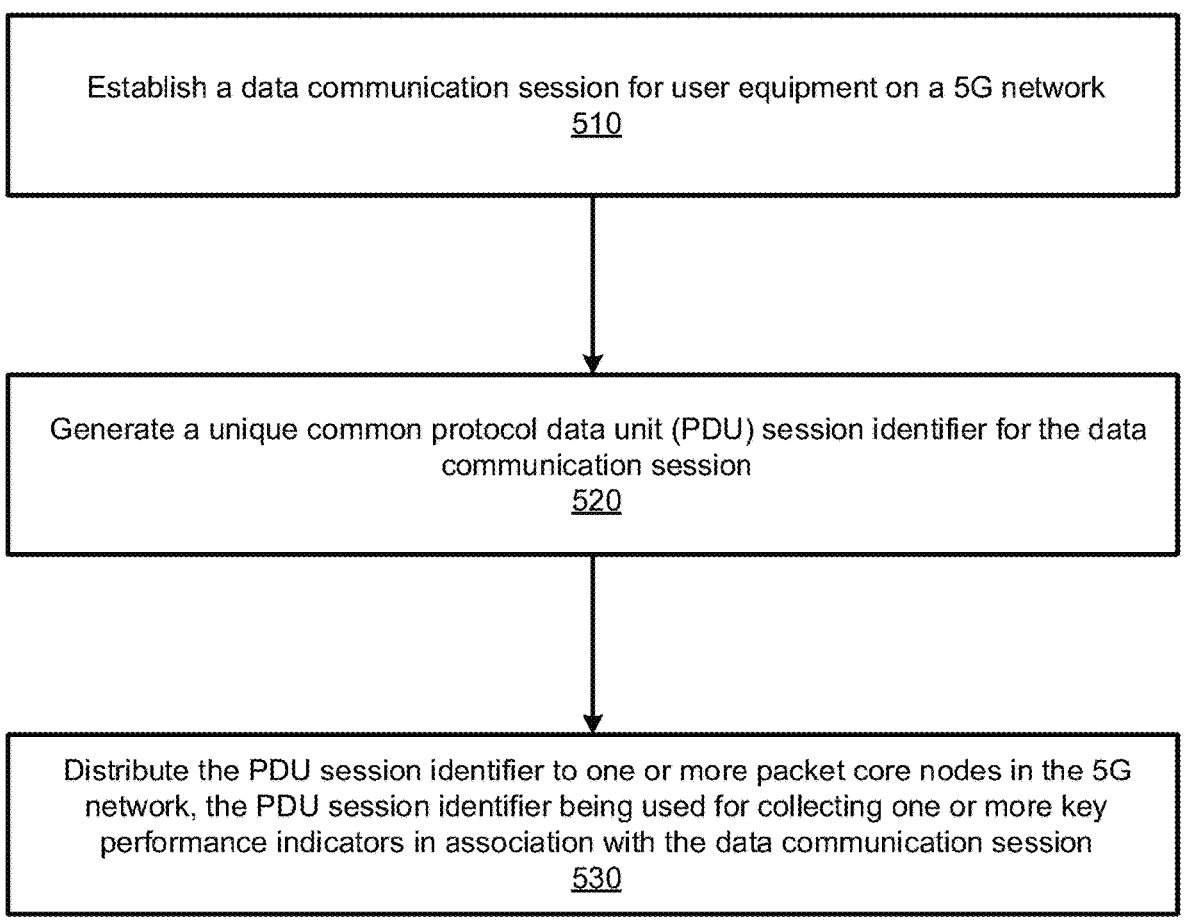
FIG. 5A is a flowchart of a method for identifying a PDU session within a 5G enterprise network and providing assurance based on the identified PDU session, according to some aspects of the present disclosure.
Figure 6:
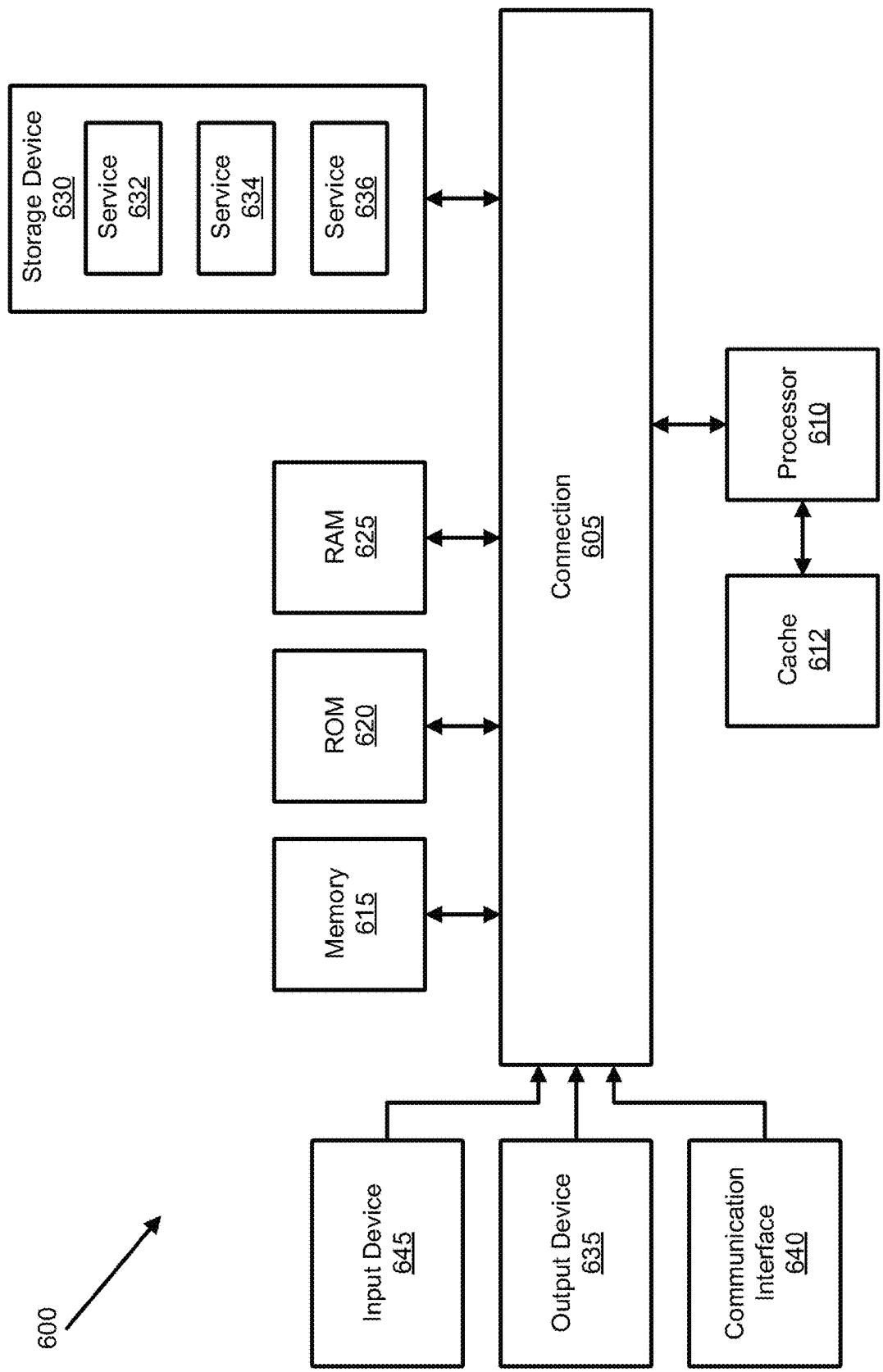
FIG. 6 shows an example of a system for implementing certain aspects of the present technology, according to some aspects of the present disclosure.

FIG. 5A illustrates an example method for identifying a PDU session within a 5G enterprise network and providing assurance based on the identified PDU session, according to some aspects of the present disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, method 500 includes establishing a data communication session for user equipment on a 5G network at step 510. For example, SMF 330 illustrated in FIG. 3A cam establish a data communication session for user equipment on RAN 220

According to some embodiments, method 500 includes generating a unique protocol data unit (PDU) session identifier for the data communication session at step 520. For example, SMF 330 illustrated in FIG. 3A can generate a unique common PDU session identifier for the data communication session. In some example embodiments, the PDU session identifier includes a node internet protocol address, a software process identifier, and a random number illustrated in FIG. 3B.

According to some embodiments, method 500 includes distributing the PDU session identifier to one or more packet core nodes in the 5G network, the PDU session identifier being used for collecting one or more key performance indicators in association with the data communication session at step 530. For example, SMF 330 illustrated in FIG. 3A can distribute the PDU session identifier to AMF 310 at operation 328. In some example embodiments, the PDU session identifier contains an authentication session identifier, the authentication session identifier used to troubleshoot communication between the one or more packet core nodes and an assurance service. In some example embodiments, the PDU session identifier is distributed to one or more packet core nodes in the 5G network as part of an existing messaging paradigm. In some example embodiments, the one or more key performance indicators can include an event and state history of the session, a flow diagram, or node issues. For example, the key performance indicators can show the packet flow throughout the nodes of the 5G network as part of a directed graph, or report node issues relating to latency or other factors. In some example embodiments, the PDU session identifier comprises an international mobile subscriber identity (IMSI) and a PDU session identifier provided by the user equipment.

Figure 5B:
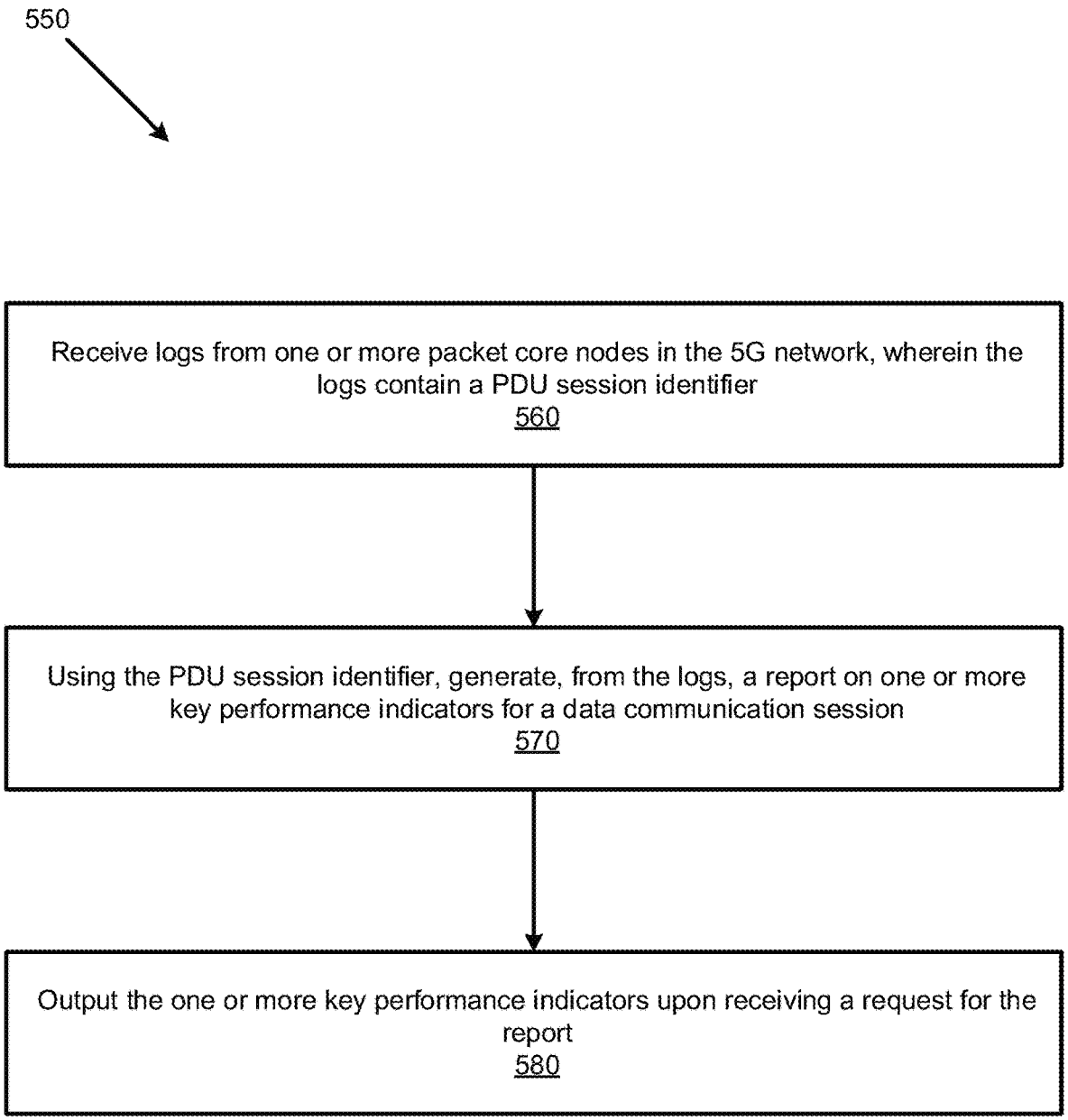
FIG. 5B is a flowchart of a method for using the PDU session identifier for collecting key performance indicators, according to some aspects of the present disclosure.

FIG. 5B illustrates an example method for using the PDU session identifier for collecting key performance indicators, according to some aspects of the present disclosure. Although the example method 550 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, method 550 includes receiving logs from one or more packet core nodes in the 5G network wherein the logs contain a PDU session identifier at step 560. For example, network management and assurance cloud service 420 illustrated in FIG. 4 can receive logs from one or more packet cores 460 in the 5G network.

According to some embodiments, method 550 includes, using the PDU session identifier, generating, from the logs, a report for a data communication session at step 570. For example, network management and assurance cloud service 420 illustrated in FIG. 4 can use the PDU session identifier to generate, from the logs, a report for a data communication session. In some example embodiments, a plurality of sessions each having a PDU session identifier are correlated with a single international mobile subscriber identity (IMSI).

According to some embodiments, method 550 includes outputting the one or more key performance indicators upon receiving a request for the report at step 580. For example, network management and assurance cloud service 420 illustrated in FIG. 4 can output the one or more key performance indicators upon receiving a request for the report.

FIG. 6 shows an example of computing system 600, which can be for example any computing device making up SMF 330, or any component thereof in which the components of the system are in communication with each other using connection 605, according to some aspects of the present disclosure. Connection 605 can be a physical connection via a bus, or a direct connection into processor 610, such as in a chipset architecture. Connection 605 can also be a virtual connection, networked connection, or logical connection.

In some example embodiments, computing system 600 is a distributed system in which the functions described in this disclosure can be distributed within a datacenter, multiple data centers, a peer network, etc. In some example embodiments, one or more of the described system components represents many such components each performing some or all of the function for which the component is described. In some example embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some example embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some example embodiments, a service can be software that resides in memory of a client device and/or one or more servers of a content management system and perform one or more functions when a processor executes the software associated with the service. In some example embodiments, a service is a program or a collection of programs that carry out a specific function. In some example embodiments, a service can be considered a server. The memory can be a non-transitory computer-readable medium.

In some example embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   establishing a data communication session for user equipment on a 5G network;
   generating a protocol data unit (PDU) session identifier for the data communication session; and
   distributing the PDU session identifier to one or more packet core nodes in the 5G network, the PDU session identifier being used for collecting one or more key performance indicators in association with the data communication session.

2. The method of claim 1, wherein the PDU session identifier comprises a node internet protocol (IP) address, a software process identifier, and a random number.

3. The method of claim 1, wherein the PDU session identifier is used for collecting the one or more key performance indicators by:
   receiving logs from the one or more packet core nodes in the 5G network, wherein the logs contain the PDU session identifier;
   using the PDU session identifier, generating, from the logs, a report on the one or more key performance indicators for the data communication session; and
   outputting the one or more key performance indicators upon receiving a request for the report.

4. The method of claim 1, wherein the PDU session identifier contains an authentication session identifier, the authentication session identifier used to troubleshoot communication between the one or more packet core nodes and a network management service.

5. The method of claim 1, wherein the PDU session identifier is distributed to the one or more packet core nodes in the 5G network as part of an existing messaging paradigm.

6. The method of claim 1, wherein the one or more key performance indicators include an event and state history of the session, a flow diagram, or node issues.

7. The method of claim 1, wherein the PDU session identifier is generated by a session management function of a core component of the 5G network and shared with the one or more packet core nodes.

8. A network device comprising:
   one or more memories having computer-readable instructions stored therein; and
   one or more processors configured to execute the computer-readable instructions to:
   establish a data communication session for user equipment on a 5G network;

generate a protocol data unit (PDU) session identifier for the data communication session; and distribute the PDU session identifier to one or more packet core nodes in the 5G network, the PDU session identifier being used for collecting one or more key performance indicators in association with the data communication session.

9. The network device of claim 8, wherein the PDU session identifier comprises a node internet protocol (IP) address, a software process identifier, and a random number.

10. The network device of claim 8, wherein the PDU session identifier is used for collecting the one or more key performance indicators by:

receiving logs from the one or more packet core nodes in the 5G network, wherein the logs contain the PDU session identifier;

generating, from the logs, a report on the one or more key performance indicators for the data communication session; and outputting the one or more key performance indicators upon receiving a request for the report.

11. The network device of claim 8, wherein the PDU session identifier contains an authentication session identifier, the authentication session identifier used to troubleshoot communication between the one or more packet core nodes and a network management service.

12. The network device of claim 8, wherein the PDU session identifier is distributed to the one or more packet core nodes in the 5G network as part of an existing messaging paradigm.

13. The network device of claim 8, wherein the one or more key performance indicators include an event and state history of the session, a flow diagram, or node issues.

14. The network device of claim 8, wherein the PDU session identifier is generated by a session management function of a core component of the 5G network and shared with the one or more packet core nodes.

15. One or more non-transitory computer-readable media comprising computer-readable instructions which, when executed by one or more processors of a network device, cause the network device to:

establish a data communication session for user equipment on a 5G network;

generate a protocol data unit (PDU) session identifier for the data communication session; and distribute the PDU session identifier to one or more packet core nodes in the 5G network, the PDU session identifier being used for collecting one or more key performance indicators in association with the data communication session.

16. The one or more non-transitory computer-readable media of claim 15, wherein the PDU session identifier comprises a node internet protocol (IP) address, a software process identifier, and a random number.

17. The one or more non-transitory computer-readable media of claim 15, wherein the PDU session identifier contains an authentication session identifier, the authentication session identifier used to troubleshoot communication between the one or more packet core nodes and a network management service.

18. The one or more non-transitory computer-readable media of claim 15, wherein the PDU session identifier is distributed to the one or more packet core nodes in the 5G network as part of an existing messaging paradigm.

19. The one or more non-transitory computer-readable media of claim 15, wherein the one or more key performance indicators include an event and state history of the session, a flow diagram, or node issues.

20. The one or more non-transitory computer-readable media of claim 15, wherein the PDU session identifier is generated by a session management function of a core component of the 5G network and shared with the one or more packet core nodes.

\* \* \* \* \*